United States Patent [19]

Warman

[11] 4,435,621
[45] Mar. 6, 1984

[54] SPEECH DIRECTION DETECTION CIRCUITS FOR TELEPHONE COMMUNICATION DEVICES

[76] Inventor: Bloomfield J. Warman, 67, King Harold's Way, Bexleyheath, Kent, England

[21] Appl. No.: 259,273

[22] Filed: Apr. 30, 1981

[30] Foreign Application Priority Data

Apr. 30, 1980 [GB] United Kingdom ................. 8014263

[51] Int. Cl.$^3$ ............................................ H04M 9/08
[52] U.S. Cl. ................................................ 179/81 B
[58] Field of Search ............. 179/1 CN, 1 HF, 1 VC, 179/18 BF, 81 B, 99 A, 99 P, 100 L, 18 BC; 381/110

[56] References Cited

U.S. PATENT DOCUMENTS

| | | |
|---|---|---|
| 3,395,255 | 7/1968 | Clement .......................... 179/1 VC |
| 3,714,380 | 1/1973 | Berryman et al. ............. 179/18 AH |
| 4,008,376 | 2/1977 | Flanagan et al. ................. 179/1 CN |
| 4,107,473 | 8/1978 | Pierce .............................. 179/18 BF |
| 4,115,658 | 9/1978 | Williams ......................... 179/81 B |
| 4,346,261 | 8/1982 | Hestad et al. .................. 179/81 B X |

Primary Examiner—G. Z. Rubinson
Assistant Examiner—Keith E. George

Attorney, Agent, or Firm—Sughrue, Mion, Zinn, Macpeak & Seas

[57] ABSTRACT

A device for detecting the direction of speech transmission between a telephone communication device and a telephone line connected thereto comprises a detection circuit for detecting coincidence in the phase of speech signals developed across respective impedances and an impedance network by which said device is coupled to the telephone line. The detection circuit comprises a pulse generating circuit for generating trains of pulses in response to excursions of the respective signals across a reference level, and a gating circuit responsive to the coincidence of pulses of the respective trains. In a device with separate amplification of talk and listen channels, the amplifier providing the output to the line is preferably an operational amplifier connected to have substantially zero output impedance, which makes possible a simple configuration of an impedance network of which respective impedances are effectively connected either in series or in parallel, in accordance with the direction of speech transmission. Such impedance network thus provides for the appropriate change in the phase relationship of signals developed across the respective impedance.

11 Claims, 9 Drawing Figures

SPEECH DIRECTION DETECTION CIRCUITS FOR TELEPHONE COMMUNICATION DEVICES

BACKGROUND OF THE INVENTION

This invention concerns improvements in and relating to speech direction-detecting circuits for telephone communication devices. In a variety of telephone devices, it is desirable to provide amplification of speech signals in both directions of transmission. Such devices include, for example, loudspeaking telephone terminals, two wire line repeaters or line extenders, and conference devices incorporating conference bridges and/or conference port repeaters. In such devices it is common practice to achieve stability by arranging an infinite return loss between the two directions of transmission, through the utilisation of switching arrangements so that amplified speech signals can be transmitted only in one direction at a time. The effective utilisation of such switching arrangements depends, however, upon the very rapid detection of the direction of transmission of a speech signal requiring amplification, and a correspondingly rapid switching of the amplifying system. Due to the recent advances in the technology of electronic gating, the rapid switching of the appropriate amplifier circuits presents little problem. The rapid detection of the direction of transmission of speech signals, however, poses more of a problem, and it has proved extremely difficult to provide an arrangement for reliably detecting the direction of speech transmission without at the same time increasing the time required for such directional detection to the extent that the intelligibility of transmitted speech is reduced by undesirable clipping of the beginnings of speech signals. It has proved difficult to detect the presence of low level signals from the distant end of the line whilst relatively larger signals are being applied to the line at the near end so that the distant end is able to interrupt and be heard.

SUMMARY OF THE INVENTION

It is accordingly an object of the present invention to provide a speech direction detecting device for a telephone communication apparatus which enables reliable detection of the speech direction more rapidly than has been possible with hitherto known devices and to permit this detection to be effective even whilst relatively higher signals are being sent to the line so as to enable the possibility of interruption by the distant end.

In accordance with the present invention there is provided a speech direction detecting circuit for a telephone communication device, comprising means for detecting speech signals at two distinct points in a speech transmission path between the output of an amplifier and a telephone line, said points being arranged in an impedance network whereby speech signals received at said points will be in phase or out of phase in dependence upon the direction of transmission thereof between the telephone communication device and the corresponding telephone line; means responsive to the detected speech signals at the respective points for generating trains of pulses in response to excursions of said speech signals across a predetermined reference level; and comparator means for comparing said trains of pulses and providing a corresponding output signal when pulses of said trains coincide in time.

Since the device in accordance with the invention relies upon the detection of the transition of the speech signals through a reference point, rather than requiring rectification or integration of signals to be identified, it is inherently very rapid, and may be rendered extremely sensitive to low level speech signals by providing that the said predetermined reference level comprises the zero crossing point of the detected speech waveform. Such an arrangement, moreover, ensures that effective operation of the device is retained, even in the event of distorted speech signals of very high amplitude.

Advantageously, the said means for generating said trains of pulses are arranged to generate pulses of varying duration depending upon the frequency of the detected speech signals in a sense such that the duration of said pulses is greater at lower frequencies and vice versa, i.e. shorter at higher frequencies.

Such an arrangement can be made to impose an upper limit of frequency on the range over which the circuit will operate through being arranged to generate progressively shorter pulses as the periodicity increases, so that pulses are not generated above an upper limit of frequency.

As well as restricting the range over which the circuit must respond with accurately generated pulses, this also tends to restrain variations of pulse ratio so that comparisons on concurrency of low frequency signals is conducted using relatively wide pulses whilst higher frequencies are compared using relatively narrow pulses. This gives the best possible sensitivity in conjunction with wide working tolerances against erroneous comparisons across the frequency range to which the operation of the circuit has been thus restricted.

Although the use of a zero reference level for operation of the pulse generating means increases the sensitivity and rapidity of action of the device, particularly where amplification of the signal to be applied to the pulse generator means is provided for, such an arrangement may lead to instability under quiescent conditions, in view of its tendency to respond to extraneous amplifier or line noise as if it were a speech signal. Thus, in accordance with a preferred embodiment of the invention, the device may include at least one further means for generating a train of pulses in response to the excursion of speech signals across a reference level displaced from said zero reference level, the or each said further means being connected in parallel with one or a corresponding one of said pulse generating means and the arrangement being such that said comparator means provides said output signal only in response to the coincidence of pulses of all of said trains.

Such an arrangement introduces a threshold into the working of the direction detector device, without sacrifice of the accuracy and rapid response of the device to the pulse trains generated by the pulse generating means.

Preferably, the means for generating said trains of pulses are arranged to provide said pulses in response to unidirectional excursions of said speech signals across said reference level of reference levels.

In an alternative arrangement for introducing a threshold into the working of the direction detector device, said device may include a further pulse generating means arranged to provide, in response to each half cycle of one of said detected speech signals preceding a unidirectional excursion of said signal across said zero reference level, a pulse of a duration varying in proportion to the amplitude of said half cycle of the speech signal, the arrangement being such that said comparator means provides said output signal only in response to the coincidence of pulses from all of said pulse generating means.

The level of sensitivity required of the device can be determined, in relation to the threshold of operation set by the arrangements referred to above, by adjusting the gain of appropriate amplifying means which may be provided for amplifying the signals detected by said detecting means before such signals are applied to the pulse generating means.

DESCRIPTION OF THE PREFERRED EMBODIMENT

Figure 1:
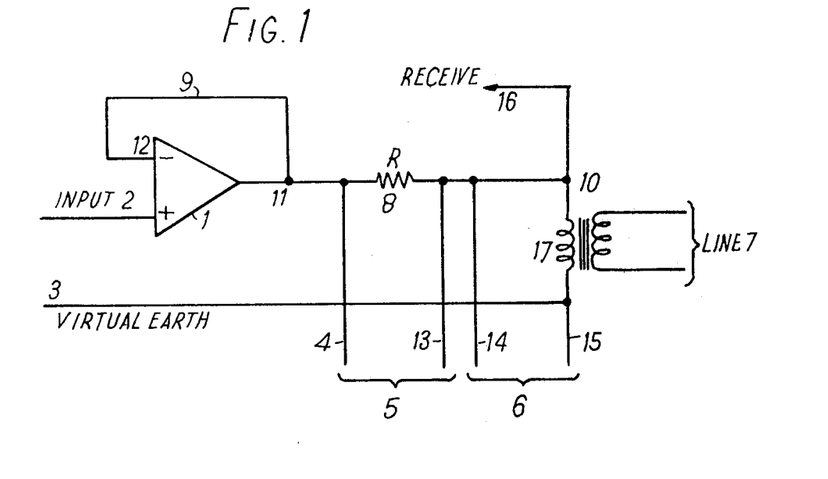
FIG. 1 is a diagram illustrating the manner in which a phase difference can be detected in speech signals arising in an amplified telephone device, in accordance with the direction of transmission of signals.

Turning now to FIG. 1, there is shown a circuit diagram of a part of a telephone apparatus in which a speech output signal to be transmitted to a telephone line 7 via a line transformer 10 is arranged to be amplified by way of an operational amplifier 1. Signals received from the telephone line 7 via the transformer 10 are fed to a receiving channel of the telephone apparatus, not shown, via lead 16. The operational amplifier 1 is connected and a voltage follower by the direct feedback connection 9 from the output 11 to the inverting input 12. This causes it to exhibit a very low output impedance which will be virtually indistinguishable from that provided by an earth at this point 11 except that the voltage will rest at the midpoint of the balanced power supply which is conventional for the supply of an operational amplifier and is therefore not shown in detail. The midpoint potential line 3 which is connected to the midpoint of the balanced power supply may therefore be thought of as a virtual earth and the output 11 as an extension to this. The line 7 is coupled via the transformer 10 to the output 11 of the operational amplifier 1 which exhibits virtually zero impedance so that the line may be loaded by a resistor R8 the value of which may be chosen to provide a suitable match for the impedance of the line 7.

In the arrangement shown in FIG. 1, it will be seen that when a speech signal is being transmitted from the line 7 via transformer 10, the signal is developed across the secondary winding 17 of transformer 10 and across resistor R8 which is effectively connected in parallel with the winding 17 as a result of the above described configuration of the amplifier 1. The signal across the secondary winding 17 will thus be in phase with that developed across resistor R8. When, on the other hand, the operational amplifier 1 is sending signals to the line 7 from its output 11, the resistor R8 and the winding 17 will be in series connection and thus the signal developed across resistor R8 will be out of phase with that across the winding 17 of the transformer 10. Thus by connecting output tappings 4 and 13 across resistor R8 and 14 and 15 across the winding 17 of transformer 10, output signals can be derived at corresponding outputs 5 and 6, the phase relationship of which will be representative of the direction of speech transmission to or from the line 7.

Figure 2:
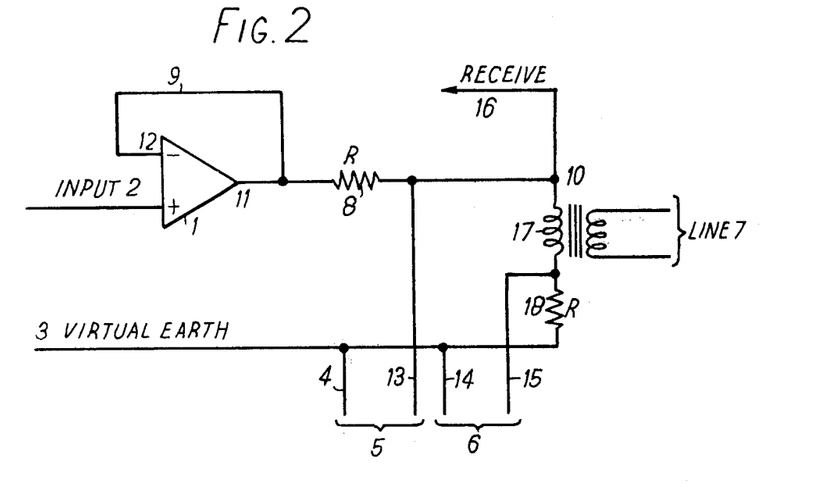
FIG. 2 is another view of a similar arrangement.

FIG. 2 shows another arrangement in which like components have been indicated with like reference numerals. The operational amplifier 1 is identically arranged to that of FIG. 1, and connected as a voltage follower to give a very low output impedance so that it provides earth type output conditions at 11 very close to the midpoint voltage level on the virtual earth 3 which is the bias line of the operational amplifier so that points 11 and 3 can again be considered as joined.

Thus the transformer is now loaded at its secondary 17 to match the line 7 by the combined resistance of resistor 18 and resistor 8 in series.

Signals from the line will give rise to in-phase signals across the outputs 5 and 6 at 13 to 4 and 14 to 15. However, when signals are being sent to line the signals across 13 to 4 and 14 to 5 will be out of phase. Thus, the phase relationships at these outputs 5 and 6 can be taken as representative of the direction of transmission in a manner similar to that of FIG. 1.

Figure 3A:
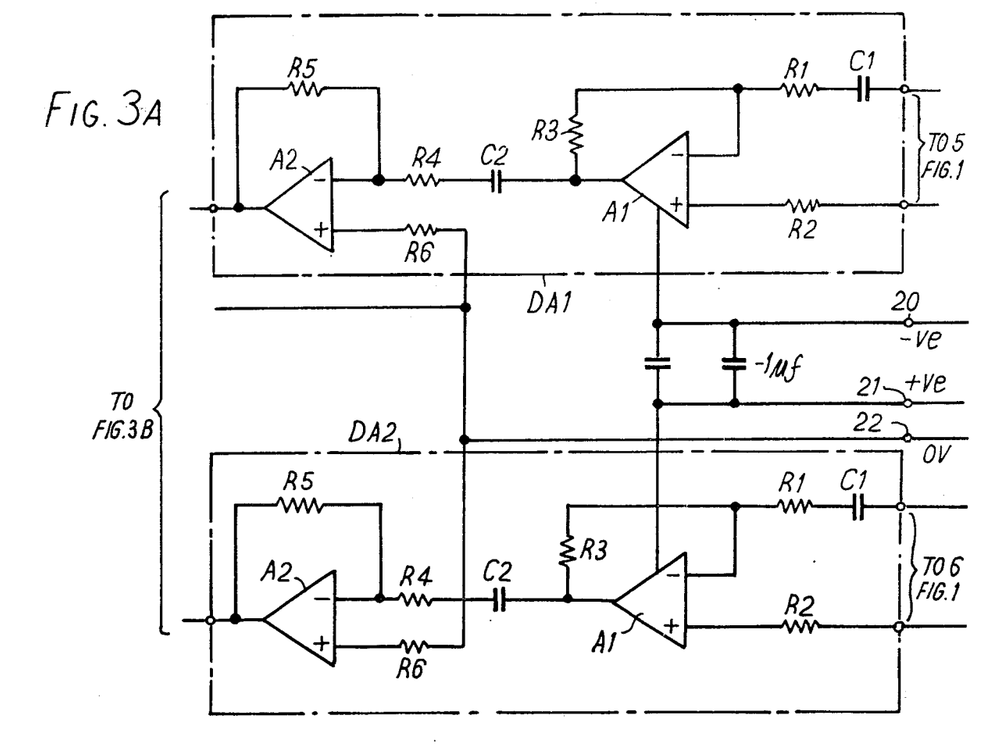
FIGS. 3A and 3B are a circuit diagram of a speech direction detecting circuit in accordance with the invention.
Figure 3B:
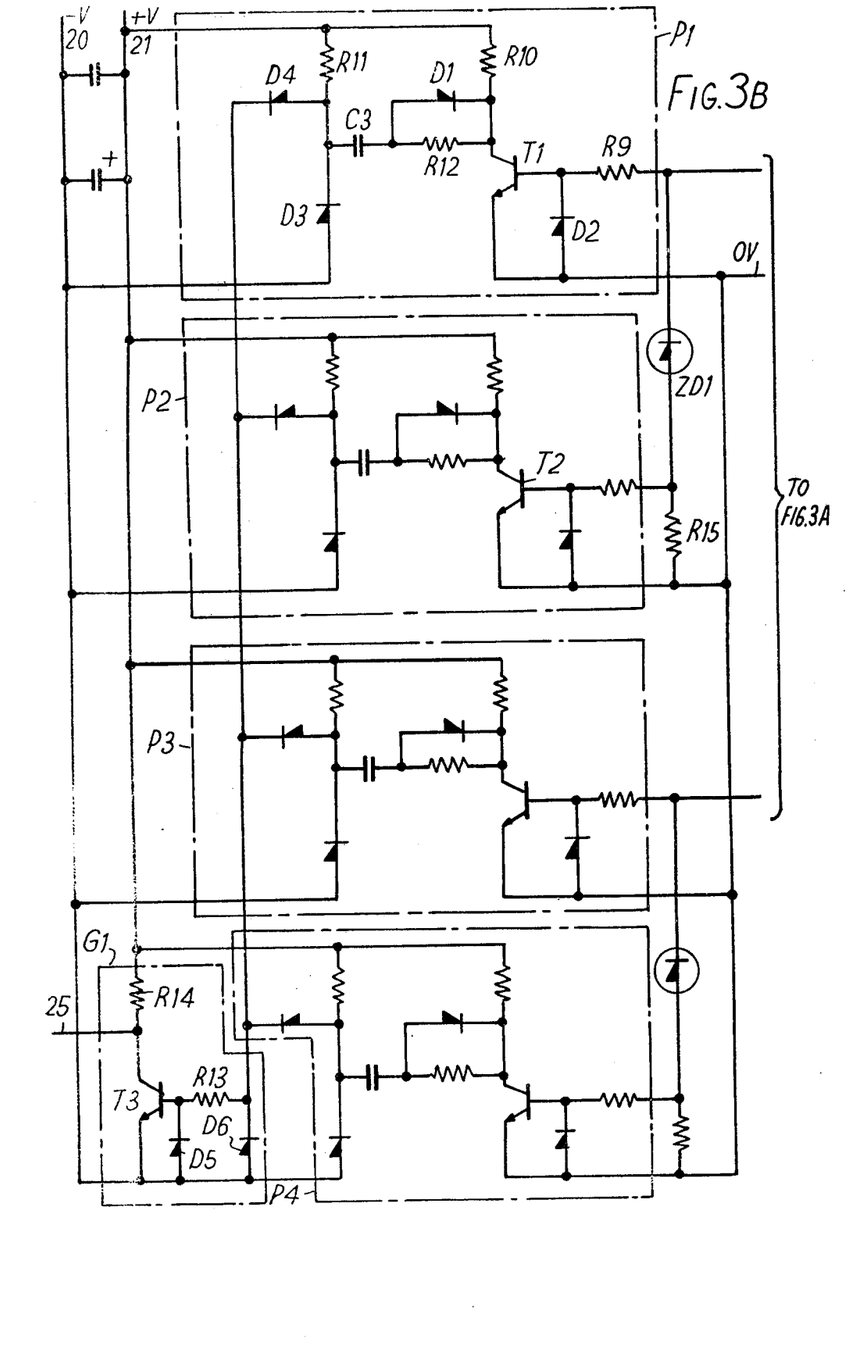

Turning now to FIG. 3, there is shown a speech direction detection device in accordance with the invention which makes use of input signals derived from outputs 5 and 6 of a circuit arrangement such as shown in FIG. 1. For convenience the circuit of FIG. 3 may be divided into two sections 3A and 3B, section 3A representing a signal detection and amplification stage, and FIG. 3B representing a pulse generator and comparator stage.

To summarize the general operation of the circuit shown in FIG. 3, the portion shown in FIG. 3A comprises two identical detection and amplification channels shown within the boxes indicated in broken lines as DA1 and DA2, the function of each of these channels being to receive the speech signal from a respective output 5 or 6, and to provide this signal at its output in amplified form, the signal being centred on a zero voltage reference level.

The section of the circuit shown in FIG. 3B comprises four identical pulse generating circuits shown within boxes P1, P2, P3 anfd P4 in broken lines, the pulse generating circuits being connected in pairs P1 and P2, and P3 and P4, to the outputs of the respective channels DA1 and DA2. The function of each of the pulse generating circuits P1 to P4 is to provide, in response to unidirectional excursions of the output signals from channel DA1 and DA2 across reference levels determined in accordance with the zero voltage reference level, corresponding series of output pulses. The outputs of all of the pulse generating circuits P1 to P4 are connected in common to a gating stage G1, the output of which at 25 is normally held at a negative voltage, and which receives a positive voltage pulse only upon coincidence of voltage pulses delivered from all of the pulse generators P1 to P4 simultaneously.

The inputs to detection and amplification channels DA1 and DA2 are connected to the outputs 5 and 6 from the circuit of a telephone communications device such as shown in FIG. 1 or FIG. 2. In a preferred arrangement, the inputs of channels DA1 and DA2 are connected to the outputs 5 and 6 of the device shown in FIG. 1, and the arrangement is such that in the quiescent condition the amplifier 1 of FIG. 1 is switched on whereas the amplifier, not shown, connected to receive signals from line 7 via the lead 16 is switched off. In such an arrangement switching of the amplifiers into the reverse condition in which amplifier 1 is switched off and the other amplifier is switched on will be dependent upon the presence of in phase signals being detected at outputs 5 and 6 and causing corresponding positive going pulses to appear at the output 25 of the gate G1. In known manner, such positive pulses may be used to control a suitable switching circuit for determining the switched state of the directional speech path amplifiers.

The detailed operation of the respective circuits illustrated in FIG. 3 will now be described as follows.

Figure 4:
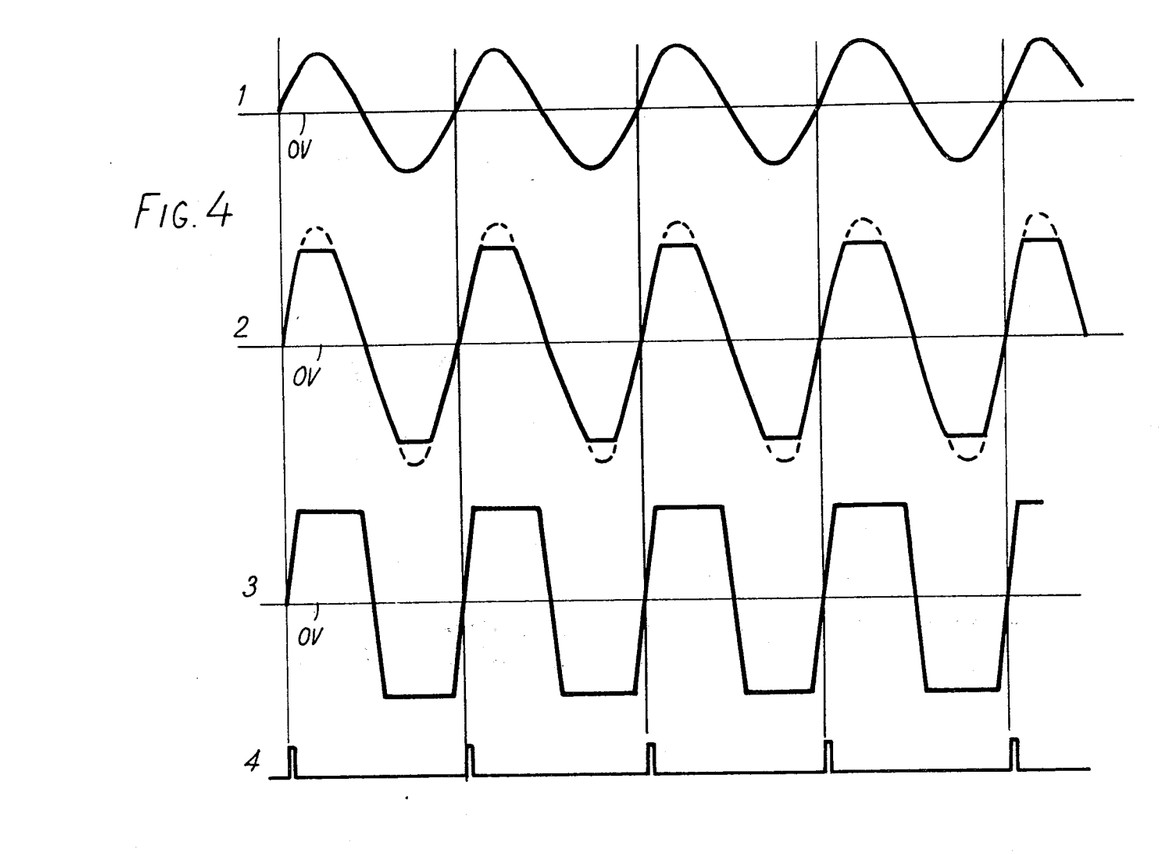
FIGS. 4 to 6 are diagrams illustrating signals occurring in the circuit of FIG. 3.

Each of the channels DA1 and DA2 comprises two operational amplifiers A1, A2 of the commonly used 741 type connected in the well known inverting mode by resistors R1, R2, R3 and R4, R5, R6, respectively. The inputs of amplifiers A1 are coupled via capacitors C1 to the outputs 5 and 6 as already mentioned above, whereas the outputs of amplifiers A1 are series connected to the inverting inputs of amplifiers A2 via capacitors C2. All four operational amplifiers are connected in common to negative and positive voltage supplies 20 and 21, although for clarity only one connection is shown to each of amplifiers A1. The non-inverting inputs of amplifiers A2 are connected by resistors R6 to a voltage source 22 at zero volts which provides a corresponding voltage reference level. The operational amplifier A1 typically has a gain of between 40 and 100 while the operational amplifier A2 has a gain in the region of 10, the levels of gain being set by the appropriate selection of the values of the feedback resistors R3 and R5. The operation of the channels DA1 and DA2 is indicated in FIG. 4, in which the waveform 1 shows an input signal such as might be received from the outputs 5 and 6 of FIG. 1, the waveform being shown in the form of an undistorted sine wave, for clarity. Unless the signal level of the waveform 1 is such as to constitute an overload of the amplifiers A1 and A2, the signal will appear at the output of the respective amplifier A2 in identical but amplified form, the signal being centred on an axis OV determined by the zero reference voltage at terminal 22. Waveforms 2 and 3 indicate how the initial sine wave shown at 1 will become increasingly distorted into the form of a square wave with increasing overloading of the amplifiers A1 and A2. It should be noted, however, that in all cases the positive excursions of the waveform across the zero reference level indicated by OV retain the same time relationship, as indicated by the vertical lines in FIG. 4. Thus despite the extreme variation of signal level which may occur in the circuit of FIG. 3A, in every case an identical series of signal pulses, as indicated at 4, can be generated in response to positive going excursions of the signal across the zero voltage level, as will be explained above. This is important in ensuring reliable operation of the direction circuit under widely varying conditions of signal input.

Since each of the pulse generating circuits P1 to P4, is identical only P1 will now be described. The output from the circuit DA1 is connected via resistor R9 to the base of a transistor T1 of which the emitter is connected to the zero voltage reference potential supply 22. A diode D2 is connected between the base and emitter of transistor T1 in order to protect the transistor T1 from extreme negative excursions of the output signal applied from the output of the amplifier A2, and also to equalize the input impedance seen by the amplifier A2 for both positive and negative excursions of the output signal. The collector of transistor T1 is connected to the positive voltage supply terminal 21 via a resistor R10 so that transistor T1 is rendered conductive whenever the signal from the output of the respective amplifier A2 provides a signal which is positive with respect to the zero reference voltage level by at least the threshold value of transistor T1. The positive voltage supply terminal 21 is also connected via a resistor R11 to the junction of diodes D3 and D4, diode D3 being connected to the negative voltage supply terminal 20 and being of a polarity such that it is normally non-conducting, while diode D4 is able to conduct current to the gating circuit G1 in a manner to be described below. The junction between diodes D3 and D4 is connected via a capacitor C3 and a diode D1 to the collector of transistor T1, a further resistor R12 being connected in parallel with diode D1.

The operation of each pulse generating circuit is illustrated diagrammatically in FIG. 5, and will now be described with particular reference to the pulse generating circuit P1. Under quiescent conditions, the operational amplifier A2 will hold its output potential at essentially the same as that of the zero voltage reference level. Accordingly, the transistor T1 will be non-conductive, and current will flow from the positive voltage supply 21 via resistor R11 and diode D4 to the output of the pulse generating circuit to provide a steady state positive output signal. Diodes D1 and D3 will be non-conductive and capacitor C3 will become charged by way of resistors R10, R11, R12 and diode D4.

Upon receipt of a speech signal from channel DA1, this will be applied via resistor R9, to the base of transistor T1. The speech signal may have a waveform such as, for example, indicated at FIG. 5(1). Upon each excursion of this voice signal in a positive direction with reference to the zero voltage reference level indicated at OV in FIG. 5(1), transistor T1 will be turned on, and thus at the collector of transistor T1 there will appear a corresponding square wave signal such as illustrated in FIG. 5(2). As soon as transistor T1 becomes conductive, there is established a rapid discharging path for capacitor C3 via diode D1 and transistor T1 to the zero reference voltage potential source 22, this path being completed via the diode D3 from the negative supply 20. During rapid discharge of the capacitor C3 current is robbed from resistor R11, diode D4 being rendered non-conductive by the negative voltage developed across the diode D3. The waveform in FIG. 5(3) is that which appears at the junction of D3, D4 and R11, whilst that shown in FIG. 5(4) is the corresponding negative pulse appearing at the output of the circuit P1. It will be seen that the amplitude of the pulses in the waveform of FIG. 5(3) is variable, this being due to a variation in the initially charged state of the capacitor C3 as described below. In accordance with the varying amplitude of the pulses of the waveform of FIG. 5(3) there is a corresponding variation in the duration of the pulses as shown in FIG. 5(4).

Figure 5:
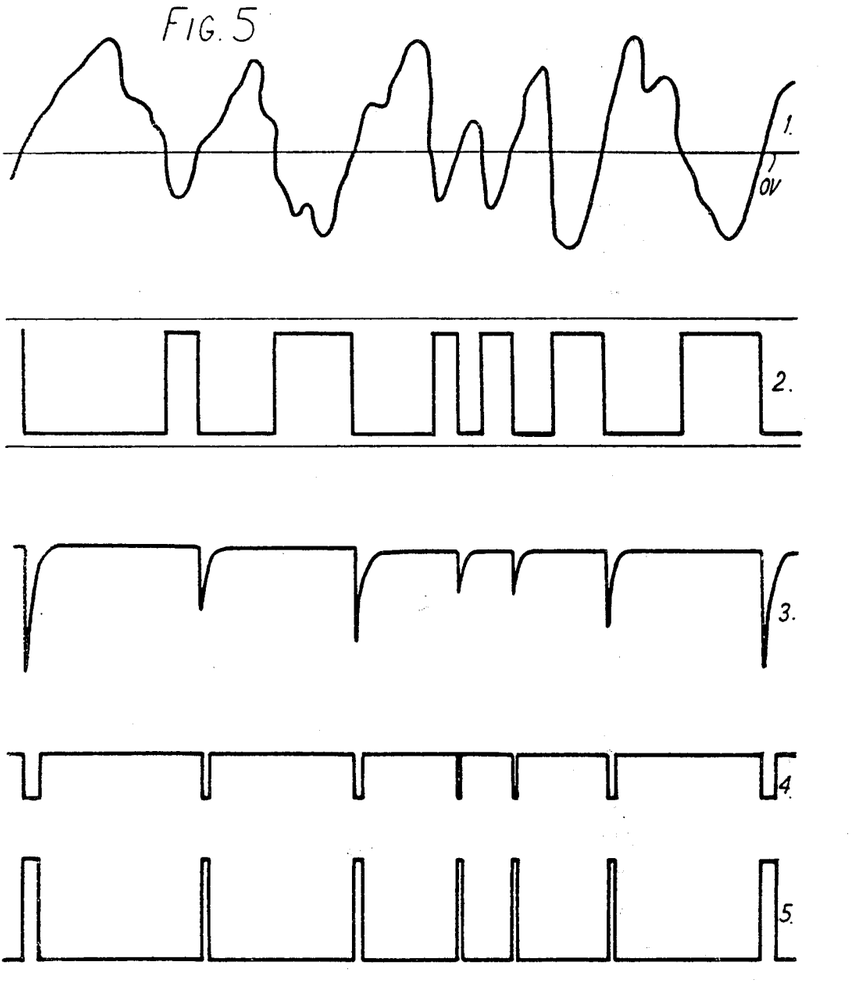

At the end of each positive excursion of the speech signal shown in FIG. 5(1), the transistor T1 is rendered non-conductive, and its collector recovers its positive potential. At this point the capacitor C3 will charge relatively slowly via resistors R10 and R12 and the current path to diode D4. The value of the resistance R12 is relatively high so that capacitor C3 will charge relatively slowly, and will fail to charge to its full potential when square wave pulses of relatively short duration appear at the collector of transistor T1. When capacitor C3 is not fully charged, then the pulses of the waveform illustrated at FIG. 5(3) will be of smaller amplitude, as described above, and thus the diode D4 will become non-conductive for shorter periods. At an upper frequency limit of the speech signal, for example in the range of 3 to 4 kHz, the point is reached at which the capacitor C3 is unable to charge sufficiently to cause the cessation of current through diode D4, and no pulses appear at the output of the pulse generating circuit. An upper limit of frequency is thus imposed on the range over which the circuits must guarantee to generate accurately timed pulses.

The gating circuit G1 comprises a transistor T3 the collector of which is connected to the positive voltage supply via a resistor R14, and the emitter of which is connected to the negative voltage supply. A tapping from the collector provides the output 25 referred to above, and the base of transistor T3 is connected to receive signals from the pulse generating circuits via resistor R13. Diodes D5 and D6 serve to protect the transistor T3 against negative voltage pulses, and also to provide appropriate capacitive loading of the input to the gating circuit G1. Upon transmission of negative voltage pulses from a pulse generating circuit, for example P1, the transistor T3 will, in the absence of signals from other sources, be rendered non-conductive. Thus, in response to the series of pulses shown, for example, at FIG. 5(4) there will appear at the collector of transistor T3 a corresponding series of positive going voltage pulses as shown at FIG. 5(5). As mentioned above such a series of positive going pulses will be transmitted to a corresponding electronic switching gate in order to effect switching of the speech path amplifiers to the receiving mode. However, since the outputs of the pulse generating circuits are connected in common to the base of transistor T3, pulses will not occur at the output 25 unless all of the pulse generating circuits simultaneously apply pulses to the base of transistor T3. Thus, for example, if the pulses from pulse generators P1 and P3 are out of phase with one another, as a result of a corresponding phase difference in the speech signals applied from outputs 5 and 6 to the inputs of the corresponding detection and amplification channels DA1 and DA2, the pulses will have no effect on the transistor T3 so that the output signal from output 25 will remain as a steady state negative signal.

Figure 6:
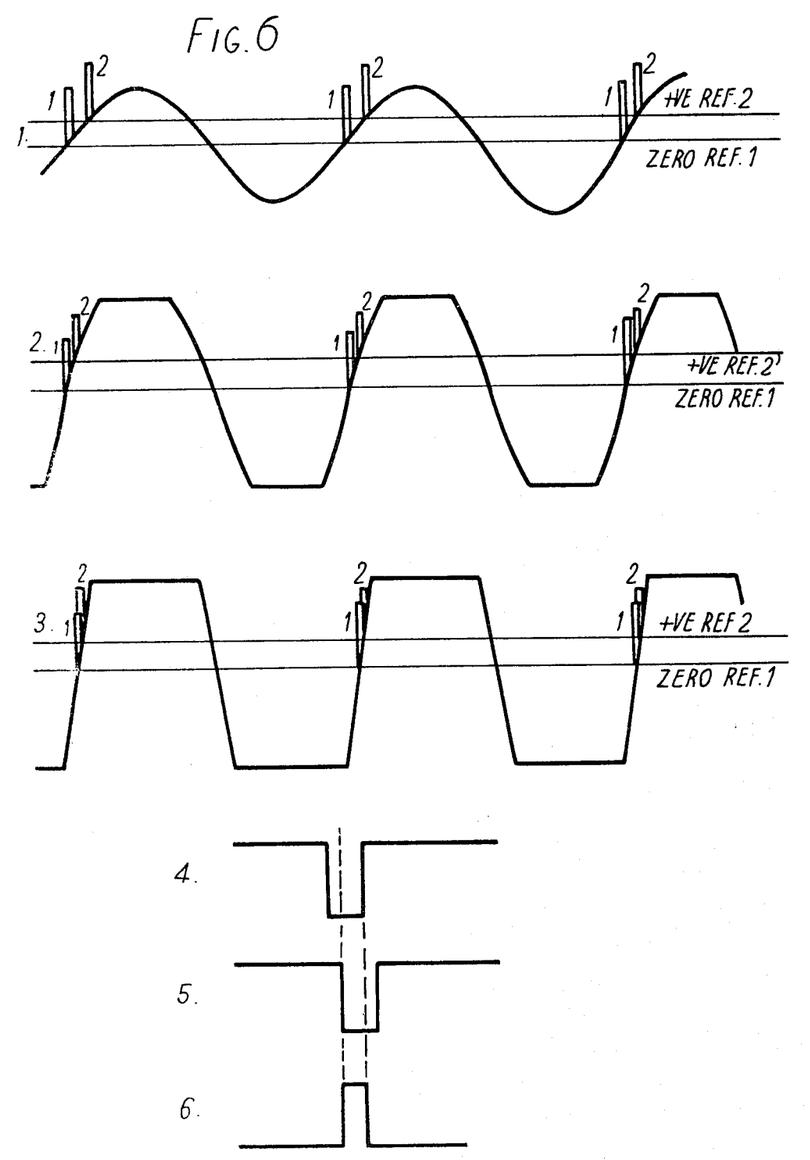

The operation of the pulse generating circuits P2 and P4 is identical with that described above for the circuit P1, and will not therefore be described in detail. It will be noted, however, that the inputs of these circuits are connected to the outputs of channels DA1 and DA2 via series connected Zener diodes and resistors indicated at ZD1 and R15 in the case of circuit P2. Thus, in order, for example, for the transistor T2 of circuit P2 to be rendered conductive it will be necessary for the positive going potential at the output of channel DA1 to exceed the zero reference voltage by an additional amount corresponding to the breakdown voltage of Zener diode ZD1. Therefore the pulses generated by the pulse generating circuit P2 will occur not exactly at the transition of the signal voltage through the zero reference level but at the transition of this signal through a reference voltage somewhat above the zero reference level. The effect of this is illustrated in FIG. 6, in which FIGS. 6(1) to (3) illustrate the relative timing of pulses generated by the pulse generating circuits P1 and P2 in response to various signal waveforms. In each of FIGS. 6(1) to 6(3) there is indicated the zero voltage reference level 1, and a positive reference level 2, on which are superimposed the signal waveform appearing at the output of channel DA1, together with, in diagrammatic form, the corresponding output pulses from the respective pulse generating circuits P1 and P2. The pulses are shown originating at the point of intersection of the appropriate voltage reference level and the signal waveform, in order to indicate the relative timing of the respective pulses.

In FIG. 6(1), it will be seen that with a relatively low level signal the output pulses become substantially time displaced with respect to one another. As the amplitude of the signal waveform increases, and the flanks of the signal waveform become steeper, however, the respective signal pulses move into coincidence with one another, as can be seen from FIGS. 6(2) and 6(3).

Since, as described above, the positive output pulse from the gating circuit G1 will not occur until the pulses of the respective pulse generating circuits are in coincidence with one another, it will be seen that the action of the Zener diode ZD1 is to provide a threshold effect in the working of the direction detection circuit such that signals of a given amplitude are required to cause effective operation thereof, without any loss being incurred in the accuracy of the timing of the generated pulses. FIGS. 6(4) to 6(6) illustrate to effect of overlap of pulses from the pulse generating circuits P1 and P2, where FIG. 6(4) indicates a pulse from circuit P1, FIG. 6(5) a pulse from circuit P2 and FIG. 6(6) the resulting pulse from circuit G1 in the absence of any other input signal. It will be appreciated that the threshold effect described is dependent only upon the amplitude of the speech signal, since the variation in the steepness of the flanks of the speech signal with frequency will be compensated by the above described variation in pulse width of the output pulses from the pulse generating circuits P1 and P2, wherein the pulse width is reduced with increasing frequency of the signal.

As already mentioned, in order for transistor T3 of the gating circuit G1 to be rendered non-conductive, it is necessary for pulses to appear simultaneously at the outputs of all four pulse generators P1 to P4. Thus each of the two pairs of pulse generators P1 and P2, and P3 an P4, are effective in inhibiting the action of the gate G1 unless the signal waveforms received from the detection and amplification channels DA1 and DA2 are of sufficient amplitude to cause overlap of the pulses from the pulse generators P1 and P2 or P3 and P4. This provides an effective threshold action in the operation of the direction detecting circuit, suitable selection of the positive reference level to which pulse generators P2 and P4 respond, in combination with the gain of the amplifying channels DA1 and DA2 ensuring that the circuit will respond to low level speech signals, but will ignore line or amplifier noises. The fact that the pulse generators respond to transition of the signals through reference levels at or near the zero voltage reference level ensures accurate operation of the device in conjunction with high gains in the amplifying channels DA1 and DA2, since, as already explained above, despite any distortion which may occur in the amplified signals due to overlapping of the amplifier stages, the points at which the amplified signal crosses the zero voltage reference level will not be varied.

Although the circuit described above provides an optimum configuration for distinguishing between low level noise signals and noise signals, it will be appreciated that various alterations may be made without departing from the scope of the invention. For example, on the assumption that the signals in both amplification channels DA1 and DA2 will be of substantially the same amplitude, one of the pulse generating circuits P2 or P4 may be omitted. For some purposes it may even be sufficient to use only the pulse generating circuits P1 and P3, without providing for the threshold action of the pulse generating circuits P2 or P4. Other arrangements may also be provided for introducing a similar threshold effect. Such an arrangement is illustrated, for example, in FIG. 7 of the drawings, which replaces the need for pulse generating circuits P2 and P4.

Figure 7:
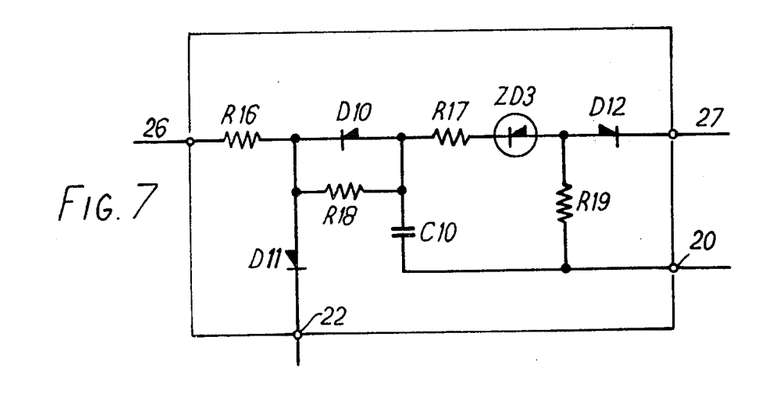
FIG. 7 is a view illustrating a modification of the circuit shown in FIG. 3.

The circuit of FIG. 7 comprises an input 26 for connection to the output of the respective amplifier channel DA1 or DA2 (it will be assumed for this explanation that it is connected to DA1), and a series circuit comprising resistor R16, parallel connected diode D10 and resistor R18, resistor R17, Zener diode ZD3, and diode D12 which provide a current supply from the output 27 to the gating circuit G1. The tapping between resistor R16 and diode D10 is connected to the zero reference potential supply 20 via a diode D11, so that this point is clamped at the zero reference potential level during positive excursions of the signal applied at input 26. A timing capacitor C10 is connected from the tapping between diode D10 and resistor R17 to the negative voltage supply and functions in the manner to be described below. The tapping between Zener diode ZD3 and diode D12 is also connected to the negative voltage supply via resistor R19 in order to stabilize the operating conditions of the Zener diode ZD3 and provide a leakage path to earth from between the back to back connected diodes ZD3 and D2.

Figure 8:
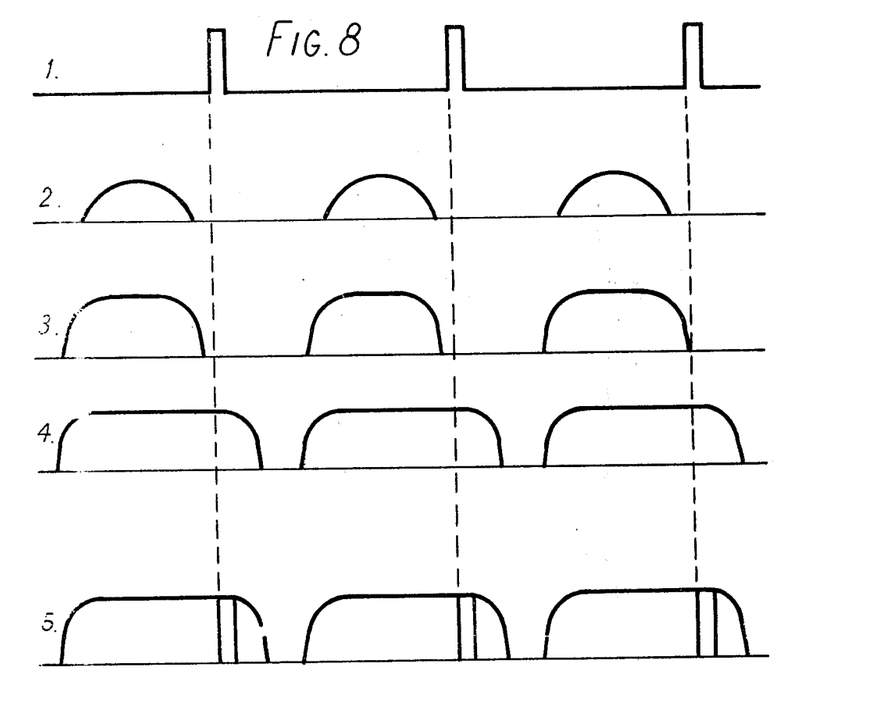
FIG. 8 is a diagrammatic view of signals arising in the circuit including the modification of FIG. 7.

During negative excursions of the signal applied to the input 26, the capacitor C10 becomes discharged to the negative potential of the input signal through the rapid discharge path provided by diode D10 and resistor R16. If the negative excursion of the signal is of sufficient amplitude that the voltage applied to the Zener diode ZD3 is reduced to the extent that the breakdown voltage of the Zener diode is no longer maintained, then the latter will be extinguished, and current will be removed from the output 27. As the signal at the input 26 now becomes more positive, the capacitor C10 will be recharged via the slow charging path R16 and R18, so that with sufficiently large negative voltage excursions of the input signal, the potential of the capacitor C10 will remain below the voltage breakdown level of the Zener diode ZD3 during the following positive going excursion of the input signal across the zero voltage reference level. This then allows the gate G1 to perform its function as a logic gate to effect comparison of the pulses from the outputs of the pulse generating circuits P1 and P3. This effect is illustrated diagrammatically in FIG. 8, in which the waveform 1 illustrates a train of output pulses that would appear at the output of gate G1 in response to the pulse train generated by the pulse generator P1, assuming that the transistor T3 is not otherwise rendered conductive by signals from the pulse generator P2 or the circuit of FIG. 7. Likewise the waveforms 2 to 4 are those that would be generated at the output of gate G1 in response to the operation of the circuit of FIG. 7, assuming that the connections to the base of transistor T3 from the pulse generating circuits P1 and P3 are removed to prevent the circuits effecting the conductivity of the transistor T3. It will be seen that the waveforms 2 to 4 are of gradually increasing duration, in response to increasingly negative excursions of the input signal applied at the input 26 of the circuit of FIG. 7, and that the relative timing of the pulses of the waveforms 2 to 4 with respect to the waveform 1 is such that only when the pulses are of a duration at least equal to those of the waveform 4 is there any overlap with the pulses of the waveform 1. This condition is illustrated diagrammatically at FIG. 8(5). Thus when the transistor T3 is subject to the actions both of the pulse generator P1 and the circuit of FIG. 7, the gate G1 will not be enabled to respond to the phase alignment of two characterising pulses from the pulse generating circuits P1 and P2 until the signal at the input 26 of the circuit of FIG. 7 has a sufficiently large negative amplitude. Such an arrangement is therefore also effective to provide a threshold against response of the direction detector circuit to very low signals such as line and amplifier noise, which might otherwise cause erratic behaviour of the detection circuit through the coincidence of erroneously produced pulses.

I claim:

1. A speech direction detecting circuit for a telephone communication device, comprising means for detecting a.c. speech signals across two impedances of an impedance network located in a speech transmission path between the output of an amplifier and a telephone line, said impedance network having a configuration such that the said two impedances of said network are effectively connected to present a load both to signals transmitted from the output of said amplifier towards said telephone line and to signals received from said telephone line, in such a manner that voice frequency signals developed across said impedances from the output of said amplifier will be phase displaced relatively to one another so that the respective signals pass through a corresponding reference level of the signal waveform at instants relatively displaced in time whereas voice frequency signals developed across said impedances from the telephone line will pass through the same reference level at the same instants in time, means for generating, in response to excursions of said signals across the reference level, trains of pulses having a duration less than the period of relative time displacement of said phase displaced signals, and a comparator arranged to compare said respective trains of pulses and to provide an output signal when the pulses of said respective trains overlap in time.

2. A circuit according to claim 1, wherein said means for generating said trains of pulses are arranged to generate pulses of varying duration depending upon the frequency of the detected speech signals in a sense such that the duration of said pulses is greater at lower frequencies and shorter at higher frequencies, and are not generated at all above an upper working limit of frequency which is thus imposed.

3. A circuit according to claim 1, wherein the said reference level is the mean level of the a.c. speech signals.

4. A circuit according to claim 3, including means responsive to the amplitude of a detected signal for inhibiting the action of said comparator means at low signal levels.

5. A circuit according to claim 3, wherein the said means for generating said trains of pulses are arranged to provide said pulses in response to unidirectional excursions of said speech signals across said reference level or reference levels.

6. A circuit according to claim 4 or 5, wherein said amplitude responsive means comprises at least one further means for generating a train of pulses in response to the excursion of said detected speech signals across a reference level displaced from said mean level, the arrangement being such that said comparator means provides said output signal only in response to the coincidence of pulses of all of said trains.

7. A circuit according to claim 5, wherein said amplitude responsive means comprises a further pulse generating means arranged to provide, in response to each half cycle of one of said detected speech signals preceding a said unidirectional excursion of said signal across said zero reference level, a pulse of a duration varying in proportion to the amplitude of said half cycle of the speech signal, the arrangement being such that said comparator means provides said output signal only in response to the coincidence of pulses from all of said pulse generating means.

8. A circuit according to claim 1, wherein the said means for detecting speech signals includes means for amplifying said signals before they are applied to said pulse generating means.

9. A speech direction detecting circuit for a telephone communication device, comprising means for detecting speech signals at two distinct points in a speech transmission path between the output of an amplifier and a telephone line, said points being arranged in an impedance network whereby a.c. speech signals received at said points will be in phase or out of phase in dependence upon the direction of transmission thereof between the telephone communication device and the corresponding telephone line; means responsive to the detected speech signals at the respective points for generating trains of pulses in response to excursions of said speech signals across a predetermined reference level which is the mean level of the a.c. speech signals; comparator means for comparing said trains of pulses and providing a corresponding output signal when the pulses of said trains coincide in time; and means responsive to the amplitude of a detected signal for inhibiting the action of said comparator means at low signal levels; and wherein said amplitude responsive means comprises at least one further means for generating a train of pulses in response to the excursion of said detected speech signals across a reference level displaced from said mean level, the arrangement being such that said comparator means provides said output signal only in response to the coincidence of pulses of all of said trains.

10. A speech direction detecting circuit for a telephone communication device, comprising means for detecting speech signals at two distinct points in a speech transmission path between the output of an amplifier and a telephone line, said points being arranged in an impedance network whereby a.c. speech signals received at said points will be in phase or out of phase in dependence upon the direction of transmission thereof between the telephone communication device and the corresponding telephone line; means responsive to the detected speech signals at the respective points for generating trains of pulses in response to excursions of said speech signals across a predetermined reference level which is the mean level of the a.c. speech signals; comparator means for comparing said trains of pulses and providing a corresponding output signal when the pulses of said trains coincide in time; and wherein said means for generating said trains of pulses are arranged to provide said pulses in response to unidirectional excursions of said speech signals across said reference level of reference levels, and wherein said circuit further comprises amplitude responsive means including at least one further means for generating a train of pulses in response to the excursion of said detected speech signals across a reference level displaced from said main level, the arrangement being such that said comparator means provides said output signal only in response to the coincidence of pulses of all of said trains.

11. A speech direction detecting circuit for a telephone communication device, comprising means for detecting speech signals at two distinct points in a speech transmission path between the output of an amplifier and a telephone line, said points being arranged in an impedance network whereby a.c. speech signals received at said points will be in phase or out of phase in dependence upon the direction of transmission thereof between the telephone communication device and the corresponding telephone line; means responsive to the detected speech signals at the respective points for generating trains of pulses in response to excursions of said speech signals across a predetermined reference level which is the mean level of the a.c. speech signals; comparator means for comparing said trains of pulses and providing a corresponding output signal when the pulses of said trains coincide in time; and wherein said means for generating said trains of pulses are arranged to provide said pulses in response to unidirectional excursions of said speech signals across said reference level or reference levels, and wherein said circuit further comprises amplitude responsive means including a further pulse generating means arranged to provide, in response to each half cycle of one of said detected speech signals preceding a said unidirectional excursion of said signal across said reference level, a pulse of a duration varying in proportion to the amplitude of said half cycle of the speech signal, the arrangement being such that said comparator means provides said output signal only in response to the coincidence of pulses from all of said pulse generating means.

* * * * *